United States Patent [19]
Ginn et al.

[11] Patent Number: 5,332,493
[45] Date of Patent: Jul. 26, 1994

[54] METHOD FOR IMPROVING RHEOLOGICAL PROPERTIES OF KAOLIN CLAYS

[75] Inventors: Michael W. Ginn, Wrightsville; Gary L. Cobb, Davisboro, both of Ga.

[73] Assignee: ECC International Inc., Atlanta, Ga.

[21] Appl. No.: 875,041

[22] Filed: Apr. 28, 1992

[51] Int. Cl.$^5$ .......................... B03B 1/04; B03B 7/00; B03C 1/02
[52] U.S. Cl. ........................................ 209/164; 209/8; 209/39; 209/214; 209/232; 501/146; 106/486; 423/113
[58] Field of Search ...................... 209/8, 39, 214, 232, 209/164, 166; 501/146; 106/486; 423/113

[56] References Cited

U.S. PATENT DOCUMENTS

| | | |
|---|---|---|
| 2,074,085 | 3/1937 | Frantz . |
| 3,138,550 | 6/1964 | Woolery . |
| 3,346,116 | 10/1967 | Jones . |
| 3,450,257 | 6/1969 | Cundy . |
| 3,471,011 | 10/1969 | Iannicelli et al. . |
| 3,627,678 | 12/1971 | Marston et al. . |
| 3,676,337 | 7/1972 | Kolm . |
| 3,853,983 | 12/1974 | Abercrombie ........................ 207/8 |
| 4,030,941 | 6/1977 | Kunkle . |
| 4,045,235 | 8/1977 | Bidwell . |
| 4,105,466 | 8/1978 | Kunkle . |
| 4,125,460 | 11/1978 | Nott ...................................... 209/8 |
| 4,225,425 | 9/1980 | Price .................................... 209/8 |
| 4,225,426 | 9/1980 | Price .................................... 209/8 |
| 4,227,920 | 10/1980 | Chapman . |
| 4,334,985 | 6/1982 | Turner, Jr. . |
| 4,419,228 | 12/1983 | Cook .................................... 209/39 |
| 4,424,124 | 1/1984 | Iannicelli ........................... 209/214 |
| 4,468,317 | 8/1984 | Turner . |
| 4,855,268 | 8/1989 | Raythatha . |
| 5,047,375 | 9/1991 | Dunaway . |
| 5,112,782 | 5/1992 | Brown . |

Primary Examiner—Thomas M. Lithgow
Attorney, Agent, or Firm—Klauber & Jackson

[57] ABSTRACT

A method for beneficiating a kaolin clay which includes quantities of smectite contaminants to reduce the low and high shear viscosities of high solids aqueous slurries of the kaolin. The smectite is converted into a pillared clay by intercalating it with a polymeric cationic hydroxy metal complex wherein the metal is ferromagnetic or diamagnetic. The kaolin and pillared smectite is then subjected as an aqueous slurry to high intensity magnetic separation, to separate the pillared smectite, and the beneficiated kaolin is recovered as product.

9 Claims, 1 Drawing Sheet

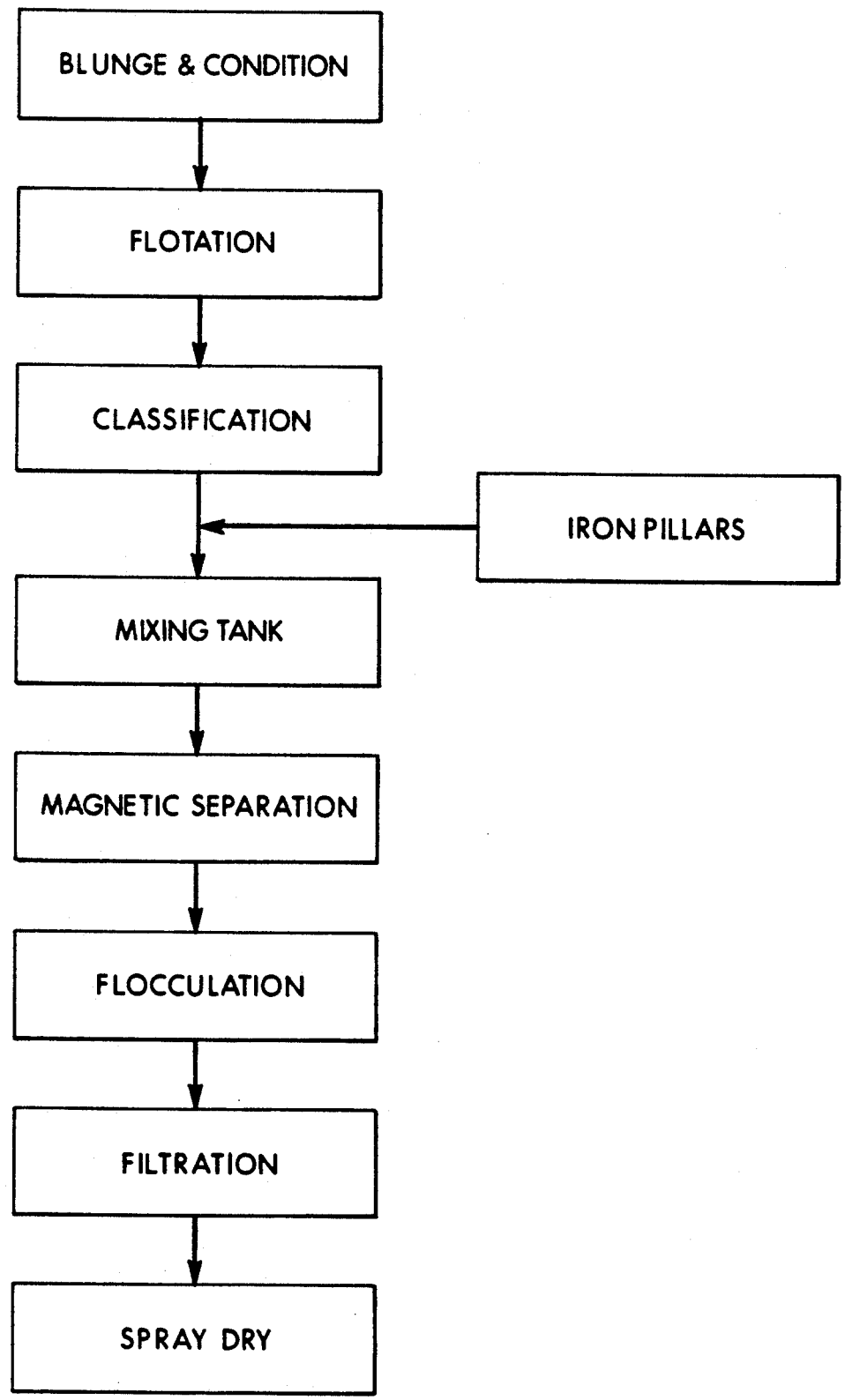

METHOD FOR IMPROVING RHEOLOGICAL PROPERTIES OF KAOLIN CLAYS

BACKGROUND OF THE INVENTION

This invention relates generally to kaolin clays, and more specifically relates to a process for beneficiating a kaolin clay to improve the rheological properties of a high solids suspension subsequently formed from the beneficiated clay, thereby rendering same more suitable for paper and paperboard coating applications. Similarly the rheological properties of the kaolin are so improved by the invention as to render same more readily shippable and handleable as an aqueous suspension or slurry, by virtue of such slurries exhibiting reduced high shear and low shear viscosities.

Kaolin clay coating pigments having very fine particle size and high brightness characteristics, are widely utilized in the coating of merchant grade papers and various types of paperboard wherein high gloss and smoothness of coating is required. Typically, these pigments are applied as a high solids aqueous suspension, i.e., a suspension including from approximately 60–75% by weight of clay solids. The size distribution of prior art pigments used for such purposes are usually such that of the order of 90–100% by weight thereof are of less than 2 microns equivalent spherical diameter (E.S.D.). Typically, further, the brightness characteristics, as measured by the standard specification established by TAPPI procedure T-646m-54, are of the order of at least 90.

Among the further qualities of a high solids coating clay slurry, which are of paramount importance for achieving high quality coatings, are the viscosity characteristics of same. It may be noted in this connection that the term "viscosity" as used herein with respect to clay slurries, refers to such characteristics as determined by the procedures of TAPPI Method T 648 su-72, as revised in 1972. This method sets forth specific procedures for determination of both the "low shear" and "high shear" viscosity. The latter, i.e. the high shear viscosity, is considered of special importance in evaluating a high solids clay slurry for the aforementioned coating purposes.

While numerous products are known and commercially available which are quite adequate (and in many instances of excellent quality) with respect to brightness, and to a lesser extent, particle size distribution, the high shear rheological qualities of these coating clays are less than would be ideally sought for. Efforts have therefore been made over the years to improve the rheological properties of such clays. Reference may be made for example to Turner, U.S. Pat. No. 4,334,985, disclosing a method wherein a 10 to 20% solids aqueous suspension of a kaolin clay is subjected to a selective theological separation, by mixing the suspension with from about 0.001% to 0.1% by weight of dry clay, of a high molecular weight anionic polymer. The treated suspension is then allowed to separate into a sedimented phase, and a supernatant phase which is found to be substantially free of aggregates. The supernatant phase containing the beneficiated kaolin pigment in suspension is then separated from the sedimented phase. The suspended product of the process can then be conventionally processed, e.g., bleached, flocced, filtered and washed, then re-dispersed and dried or mixed with previously prepared dry material, to yield a high solids (e.g. 60% to 75% solids) coating slurry having improved rheological properties.

It has long been known that smectite and other swelling clays are a basic cause of high viscosity characteristics of kaolin slurries. Virtually all kaolin clays contain some form or amount of swelling clay such as smectite, even where such quantities are below XRD detectable levels. Even relatively small concentrations of swelling clays (beyond XRD detectability) found in most kaolin grades, exaggerate the detrimental effect of clay slurry viscosities especially in the presence of higher salt concentrations. While it is therefore clear that separation of the minute smectite component from the kaolin would be beneficial in improving the viscosities of aqueous slurries formed from the beneficiated kaolin, only limited success has thus far been achieved. Mostly such success has been attained by indirection. For example, in the mentioned 4,334,985 patent, it is possible that preferential separation of aggregates may remove some smectite as well since the latter may be preferentially found in such aggregates. Mechanical working of the kaolin can also foster release of the smectite contaminants, and preferential flotation can sometimes be helpful in removing such released material from the kaolin slurry. In general, however, efforts to directly and preferentially separate the smectite contaminants have met with very limited success.

In accordance with the foregoing, it may be regarded as an object of the present invention, to provide a method for beneficiating a kaolin clay to improve the high and low shear viscosities of a high solids suspension subsequently formed from the beneficiated pigment.

It is a further object of the invention, to provide a method for beneficiating a kaolin clay which includes quantities of smectite contaminants, which by directly separating such smectites, reduces the low and high shear viscosities of high solids aqueous slurries of the beneficiated kaolin.

SUMMARY OF THE INVENTION

Now in accordance with the present invention, the foregoing objects, and others as will become apparent in the course of the ensuing specification, are achieved by converting the smectite contaminants associated with the kaolin into a pillared clay, by intercalating same with a polymeric cationic hydroxy metal complex wherein the metal is ferromagnetic or diamagnetic. The kaolin and pillared smectite are then subjected as an aqueous slurry to high intensity magnetic separation, to separate the pillared smectite, after which the beneficiated kaolin is recovered as product.

Naturally occurring and synthetic smectite clays such as montmorillonite (the predominant component of bentonite), hectorite, saponite, nontronite, etc. are generally comprised of layers which may be visualized as a "sandwich" or platelet containing two outer sheets of silicon tetrahedra and an inner or central octahedral sheets of a hydrous metal oxide, such as alumina or magnesia octahedra. These platelets are stacked one upon the other to yield a clay particle. Normally this arrangement yields a repeating structure about every ten angstroms to give a material with low surface area. Smectites can be classified into two categories, dioctahedral and trioctahedral, the differences being the number of octahedral sites in the central sheet which are occupied. This, in turn, is related to the valence of the cation in the central sheet, with the dioctahedral smectites having central cations which are trivalent and substituents which are divalent, whereas the trioctahedral smectites have divalent central cations with monovalent substituents.

It is known that increased permanent porosity can be introduced into smectite clay minerals by separating these platelets further, by as much as 30 to 40 angstroms, by intercalation with various polar molecules such as water, ethylene glycol and various amines which function as molecular props or pillars, separating the platelets and preventing the layers from collapsing to van der Waals contact. Thus, a variety of organic materials can be adsorbed on the exposed intracrystal surfaces.

In the fully expanded state, the surface area of swelling clays is theoretically calculated to be of the order of 750 m$^2$/g. In practice this surface area is not available for reaction when clays are heated about 150° C. The reason for non-accessibility is the diffusion of interlayer solvent out of the clay layers at higher temperatures, causing strong layer to layer Van der Waal contacts. To circumvent this, a number of modifications have been proposed. Among the most successful is the intercalation of metal hydroxy polymer cations followed by heating above 200° C. In the literature this process is referred to as pillaring or cross-linking. Among the most widely exposed, inorganic polymers were synthesized by hydrolysis of water soluble salts of aluminum, iron, chromium, bismuth, magnesium, zirconium, and nickel at an appropriate pH. In addition, references are known where pillaring species are derived from molybdenum, niobium, silicon and other metal irons.

Commonly, pillared clays are prepared by ion exchange of cationically charged metal hydroxy polymers with sodium ions of clays. The typical exchange reactions are conducted at temperatures around 70° C. for three hours or at room temperature over a longer period of time. In the less common method, metal hydroxy polymers are synthesized by an in situ method in the interlayers. In this case, known amounts of metal salts and an inorganic base, sodium hydroxide, are stirred with clays at room temperature for a time longer than 10 hours. Typically the ratios of hydroxyl groups to metal are in the range of 1.5 to 3.0. It has been suggested that in this range of OH/metal ratios the polymers formed are of the biggest possible size. For pillaring, bigger size cations are preferred for two reasons. First, bigger cations interact more strongly with clay layers and thus would bond preferentially. Secondly, bigger cations provide higher C-dimension expansion. Pillaring compositions useful in the process of the present invention include inter alia those disclosed in Raythatha, U.S. Pat. No. 4,855,268.

BRIEF DESCRIPTION OF DRAWING

In the drawing appended hereto:

The FIGURE is a schematic flow diagram illustrating the method of the present invention being used in processing of a typical kaolin.

DESCRIPTION OF PREFERRED EMBODIMENTS

Pursuant to the invention, and as shown in the FIGURE, the kaolin as a crude, is preferably subjected to an aqueous mechanical dispersion, i.e. by aqueous blunging and conditioning, to effect at least partial release of the smectite from the kaolin with which it is associated, is then floated and classified, and thereupon as an aqueous dispersion is admixed with the polymeric cationic hydroxy metal complex. The resultant slurry is diluted to 5 to 35% solids and subjected to a high intensity magnetic separation, by passing same through apparatus of the type disclosed in Marston, U.S. Pat. No. 3,627,678. This magnetic separation process is substantially in accord with prior art practice. Reference may be had to U.S. Pat. No. 3,471,011 to Joseph Iannicelli et al., which discloses that clay slurries may be beneficiated by retention for a period of from about 30 second to 8 minutes in a magnetic field of 8,500 Gauss or higher. Reference may also be made to U.S. Pat. No. 3,676,337, to Henry H. Kolm, disclosing a process for treating mineral slurries by passing same through a steel wool matrix in the presence of a background field of at least 12,000 Gauss. As thus disclosed in Marston 3,627,678, the slurry can be passed through a canister, which contains a stainless steel or similar filamentary ferromagnetic matrix, while a high intensity magnetic field is impressed on the matrix by enveloping coils. Following the magnetic separation the beneficiated kaolin is flocculated, filtered and dried.

The metal ion in the pillaring composition may comprise iron, which can be present as a combination of ferrous and ferric states. The metal may also comprise nickel, or ions of other ferromagnetic or diamagnetic metals may be used. Combinations of these metals may also be used. See Raythatha et al., U.S. Pat. No. 4,855,268, regarding particularly methods for producing mixed pillar smectites. The metal complex may in general be prepared by hydrolyzing an aqueous solution of a salt of the selected metal with a base.

The invention is found to significantly improve the high and low shear viscosities of a high solids suspension formed from the beneficiated pigments. It may be noted that the smectite content in the original crude tends to be concentrated in the fine fraction, e.g. from centrifuging, which lends further impetus to the need to remove such components. Thus, in some instances the smectite content can be increased in the fine fraction by an order of magnitude as compared to the crude. The invention therefore is particularly applicable and useful where the pillaring composition is added to the classified fine kaolin fraction which is yielded by the classification step of the overall beneficiation process.

The invention is further illustrated by the following Examples, which are not to be deemed delimitative of the invention otherwise set forth.

EXAMPLE I

A series of clay samples, all of which contained only small quantities of swelling clays (as indicated by the low control viscosities) were subjected to the process of the invention. In each instance the samples were processed as illustrated in the schematic flow diagram of the FIGURE. Thus, the kaolin is initially processed through a series of steps which includes subjecting such clay to a froth flotation treatment. In a preferable procedure, the crude clay is blunged and conditioned by forming an aqueous alkaline, dispersion of the clay (pH adjusted to about 7 to 10 with ammonium hydroxide), which dispersion may include as a deflocculating agent a water soluble salt of a polyacrylic acid or a polymethacrylic acid, preferably having an average molecular weight in the range of 500 to 10,000; together with sodium silicate; and oleic acid or other collector agent. Where employed, the polyacrylate and/or polymethacrylic salts are typically present from about ½ to 3 lbs/ton; suitable materials of this type are, for example, available from Allied Colloids, Great Britain, under the trade name "Dispex" (e.g. Dispex N-40). Sodium silicate is present in a range from about ½ to 16 lbs/ton; and oleic acid up to about 12 lbs/ton; preferably in the range of about 2 to 4 lbs/ton. The blunging and conditioning steps are preferably conducted simultaneously.

The slurry during the blunging and conditioning operations may include from about 20 to 70% solids, but preferably includes a relatively high solids content, i.e. from about 35 to 60% solids. The conditioning process is preferably continued for a sufficient time to dissipate at least 25 hp-hrs. of energy per ton of solids, although more generally the invention is effective where as little as 10 hp-hrs per ton of solids of energy is dissipated. The blunged and conditioned slurry, after addition of a frothing agent as, for example, pine oil, is then subjected to a conventional treatment in a froth flotation cell, i.e. air is passed through the slurry in said cell to effect separation of impurities from the clay.

Further details of froth flotation treatment are set forth at numerous patents of the prior art, as for example, in U.S. Pat. Nos. 2,990,958; 3,138,550 and 3,450,257.

Samples emerging from the flotation cell are then subjected to classification by centrifuging same to yield a recovered fraction wherein 83 to 100% by weight of the particles have an equivalent spherical diameter (E.S.D.) < 2μm, and preferably 100% < 1 μm.

A pillaring composition was then thoroughly mixed with such fraction in a mixing tank, after which the resultant slurry was subjected to treatment in a high intensity magnetic field. The pillaring compositions included various amounts of pillaring compounds containing $Fe_2$, $Fe_3$, and/or Ni, and were prepared as follows:

A. Dissolve 8.8658g of ferric trichloride hexahydrate in 250 mls of water.

B. Dissolve 3.2603g of ferrous dichloride tetrahydrate in 75 ml of water.

C. Mix both solution with good mixing.

D. Dissolve 3.4768g of anhydrous sodium carbonate in 75 ml of water.

E. Add sodium carbonate solution, extremely slowly to the mixture of ferric and ferrous chloride solution. Avoid any precipitation development.

F. Allow the solution to age at room temperature for at least 72 hours.

Where nickel ion is desired, the foregoing procedure is modified by using 8.8658g of ferric trichloride hexahydrate in 250 ml $H_2O$; 3.8868g of nickel dichloride hexahydrate in 100 ml $H_2O$; and 3.4768g of anhydrous sodium carbonate in 75 ml $H_2O$.

After mixing for a length of time, the slurry is ready to be passed through the magnetic separator.

The slurry samples thus treated included 30% solids content (after being diluted, as appropriate), and were passed through the magnetic separator at a pH of about 9.3, and at a temperature of approximately 30° C. The apparatus utilized was of the general type illustrated in the aforementioned Marston U.S. Pat. No. 3,627,678 patent, and thus generally comprised a canister packed with a stainless steel wool at which enveloping magnets provided an approximate field intensity of about 15.5 kilogauss during the separation process. The stainless steel wool had a 7.5% packing, by which it is meant that 7.5% of the canister volume was effectively occupied by the matrix material. During the magnetic treatment the flow rate of the slurry was such that retention time in the magnetic field was approximately 1.2 minutes. The samples emerging from the magnetic separator were thereupon flocculated at a pH of 3, after which a conventional leaching step was effected by addition of sodium hydrosulfite, followed by conventional dewatering, etc. to yield a test sample. The results of the foregoing operations are set forth in Table 1 hereinbelow:

TABLE I

| Kaolin Sample and Characteristics | Pillaring Ion(s) | Dosage lbs/ton of dry clay | Viscosity Brookfield in cps at 20 rpm | High Shear | Brightness | % by Weight $TiO_2$ | $Fe_2O_3$ |
|---|---|---|---|---|---|---|---|
| Coating Clay 95% <2 μm 90 Brightness | Control | | 510 cps | 520 rpm | 91.5 | .33 | .61 |
| | $FeCl_3$ | 0.5 | 440 | 740 | 91.4 | .34 | .63 |
| Coating Clay 83–85% <2 μm 90 Brightness | Control | | 230 | 1840 | 89.6 | .48 | .80 |
| | $FeCl_3$ | 0.5 | 270 | 1780 | 88.6 | .57 | .84 |
| Coating Clay 90–92% <2 μm 90 Brightness | Control | | 310 | 1030 | 90.2 | .38 | .71 |
| | $FeCl_3$ | 0.5 | 300 | 1050 | 90.4 | .37 | .70 |
| | $FeCl_3$ | 1.0 | 390 | 800 | 90.2 | .38 | .73 |
| South Carolina Hard 98% <2 μm 89–90 Brightness | Control | | 370 | 3960 | 89.2 | 1.07 | .86 |
| | $FeCl_3$ | 0.5 | 330 | 4400 | 89.9 | 1.0 | .90 |
| Coating Clay 95% <2 μm 87.5–88.5 Brightness | Control | | 300 | 15.8 @ 4400 | 88.8 | 1.22 | .79 |
| | $FeCl_3$ | 0.5 | 310 | 9.1 @ 4400 | 88.2 | 1.29 | .80 |
| | $FeCl_3/FeCl_2$ | 0.5 | 360 | 7.5 @ 4400 | 88.6 | 1.17 | .74 |
| Coating Clay 98% <2 μm 90+ Brightness | Control | | 420 | 1660 | 89.9 | .57 | .85 |
| | $FeCl_3/FeCl_2$ | 0.5 | 350 | 1720 | 89.3 | .59 | .93 |
| | $FeCl_2/NiCl_2$ | 0.5 | 410 | 1440 | 89.6 | .56 | .88 |

Floated classified products were obtained from our plant facility. These samples contained no measurable amounts of swelling clays by XRD.

The data in Table I establish clear improvements in both the low shear and high shear viscosities. These were plant product samples that contained only small quantities of swelling clays as indicated by the lower control viscosities. Only one sample (second in Table—control viscosity of 230) resulted in a poorer product in terms of viscosity and brightness. It is likely that the slight brightness drop in this sample is due to an unoptimized high pillaring compound dose.

While the present invention is particularly set forth in terms of specific embodiment thereof, it will be understood in view of the instant disclosure that numerous variations upon the invention are now enabled to those skilled in the art, which variations yet reside within the scope of the present teaching. Accordingly, the invention is to be broadly construed and limited only by the scope and spirit of the claims now appended hereto.

We claim:

1. A method for beneficiating a kaolin clay which includes quantities of smectite contaminants to reduce the low and high shear viscosities of high solids aqueous slurries of said kaolin, comprising:

converting the smectite into a pillared smectite by intercalating said smectite with a polymeric cationic hydroxy metal complex wherein said metal is ferromagnetic or diamagnetic;

subjecting the said kaolin and pillared smectite as an aqueous slurry to high intensity magnetic separation, to separate the pillared smectite from the remaining kaolin clay; and recovering the beneficiated kaolin as product.

2. A method in accordance with claim 1, wherein the said metal in said complex comprises iron.

3. A method in accordance with claim 1, wherein the said metal in said complex comprises nickel.

4. A method in accordance with claim 2, wherein the said iron is present in a combination of ferrous and ferric states.

5. A method in accordance with claim 1, wherein the kaolin beneficiated is initially provided as a crude clay, said crude being subjected to an aqueous mechanical dispersion to effect at least partial release of said smectite from associated kaolin.

6. A method in accordance with claim 5, wherein said kaolin as said crude is blunged and conditioned, floated and classified, and thereupon as an aqueous dispersion is admixed with said polymeric cationic hydroxy metal complex.

7. A method in accordance with claim 6, wherein following said magnetic separation the beneficiated kaolin is flocculated, filtered and dried.

8. A method in accordance with claim 1, wherein said magnetic separation is effected by passing said aqueous slurry through a matrix of steel wool in the presence of an enveloping magnetic field having an intensity of at least about 8.5 kiloGauss.

9. A method in accordance with claim 1, wherein said metal complex is prepared by hydrolyzing an aqueous solution of a salt of said metal with a base.

* * * * *